Nov. 2, 1926.
G. H. GILMAN
DRILLING MACHINE
Original Filed Jan. 28, 1920    2 Sheets-Sheet 1
1,605,713
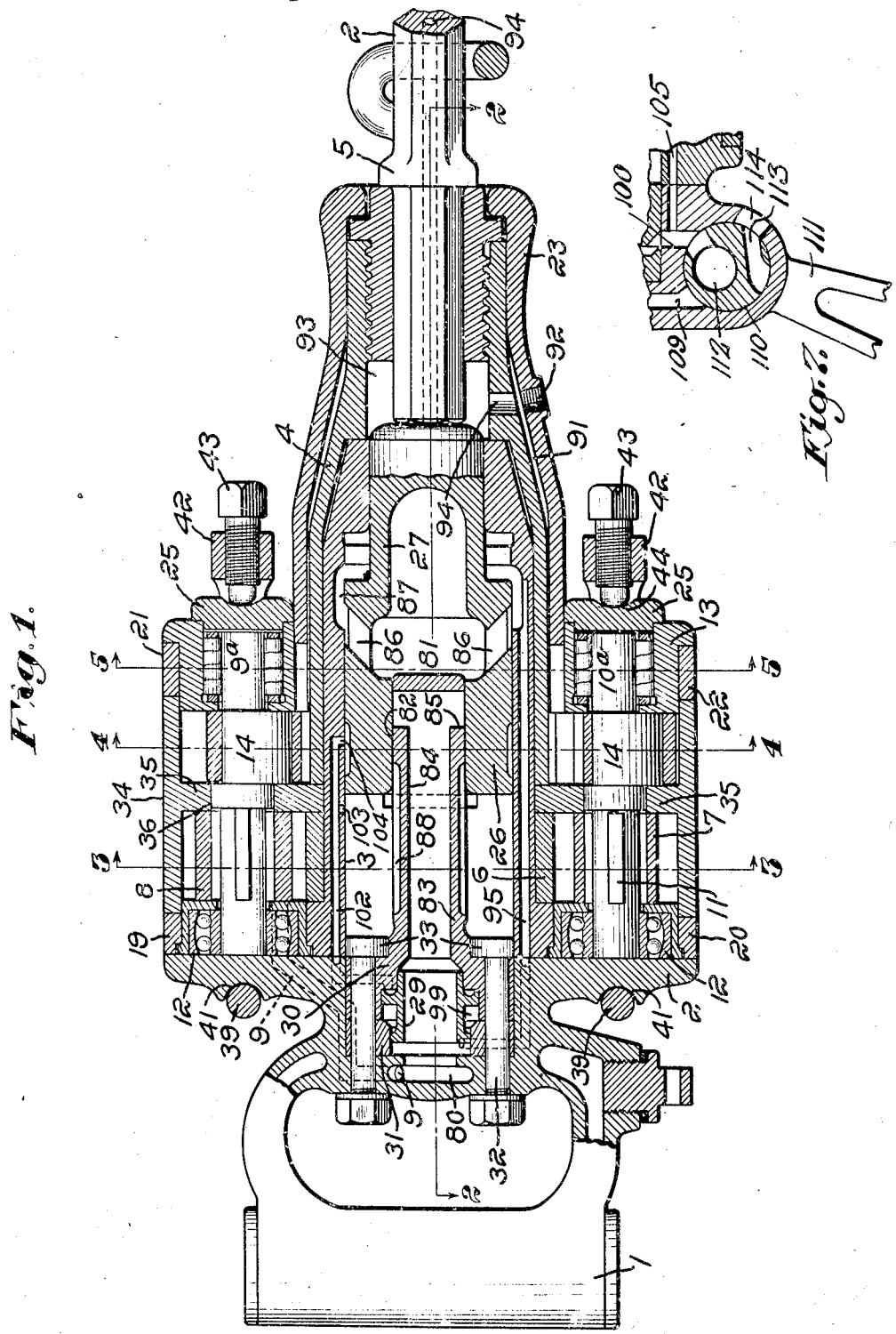
Inventor:
George H. Gilman,
by Emery Booth, Janney & Varney
Attys.

Nov. 2, 1926.  
G. H. GILMAN  
1,605,713  
DRILLING MACHINE  
Original Filed Jan. 28, 1920   2 Sheets-Sheet 2
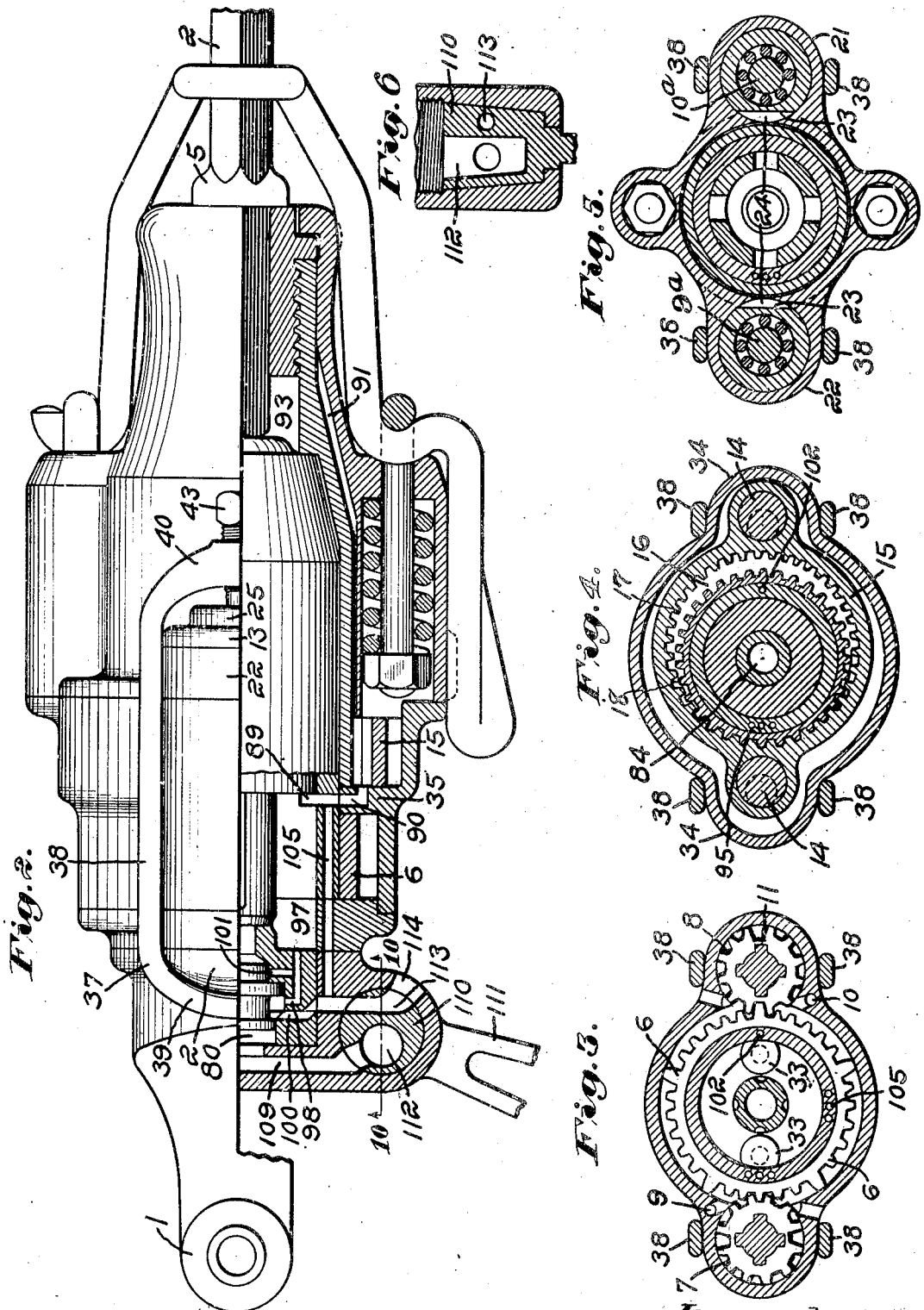
Inventor:
George H. Gilman,
by Emery Booth Janney Varney
Att'ys.

Patented Nov. 2, 1926.

1,605,713

UNITED STATES PATENT OFFICE.

GEORGE H. GILMAN, OF BOSTON, MASSACHUSETTS.

DRILLING MACHINE.

Application filed January 28, 1920, Serial No. 354,536. Renewed September 27, 1926.

My invention relates to rock drilling machines, and will be best understood from the following description when read in the light of the accompanying drawings of one specific embodiment of my invention selected for illustrative purposes, while the scope of my invention will be more particularly pointed out in the appended claims.

In the drawings:—

Fig. 1 shows a longitudinal section of the entire machine.

Fig. 2 shows an elevation of the entire machine, part being shown in section on the line 2—2 of Fig. 1.

Figs. 3, 4 and 5 respectively are sections on the lines 3—3, 4—4, and 5—5 of Fig. 1.

Fig. 6 is a section on the line 10—10 of Fig. 2, and

Fig. 7 is a section of the controlling valve according to Fig. 2 turned to another position.

Referring to Figs. 1 to 5 of the drawings and particularly to Fig. 1, I have shown a grasping handle 1 which is provided with a flange or base portion 2 to which is secured a cylinder member 3, the base portion 2 herein generally conforming to the outline of the end of the cylinder member 3, and in conjunction with the cylinder member forming a cylinder for the hammer piston as hereinafter more fully described. Rotatively supported on the front end of the cylinder is a chuck 4 which receives the drill steel 5. For rotating the chuck I provide an independent motor which in the submitted embodiment of my invention has a central annular gear member 6, which constitutes the piston of the motor, and the side gear members 7 and 8 meshing with the central gear member, which side gear members constitute the abutments for the piston 6. The motive fluid for operating the motor is admitted through ports 9 and 10 in communication with the supply conduit 80. The gear members 7 and 8 of the chuck motor are removably secured to shafts 9ª and 10ª, by means of keys 11. These shafts are supported in bearings 12 and 13, and formed integrally with the shafts or otherwise are eccentric members 14 for driving the annular gear or yoke 15. As illustrated the yoke is provided with an opening 16 having internal gear teeth 17 meshing with teeth 18 formed on the rearward portion of the chuck. Rotation of the eccentrics gives the yoke a gyratory motion such as to roll the toothed portion thereof about the toothed portion of the chuck and for one revolution of the yoke the chuck advances a distance corresponding to the difference between the number of teeth on the respective portions thus providing a great speed reduction.

As illustrated at the rear end of the cylinder member 3 is a pair of laterally extending portions or flanges 19 and 20, and aligned therewith is a pair of laterally extending portions or flanges 21 and 22 on the chuck casing 23. The lateral extensions 19 and 20 support the rearward bearings 12 for the shafts 9 and 10 while the forward bearings 13 for said shafts are supported by the lateral extensions 21 and 22 of the chuck casing. The rearward bearing 12 comprises a known form of ball-bearing providing a universal movement while the forward bearings are of the roller type. This arrangement of bearings permits the shafts to accommodate themselves to slight discrepancies of alignment of the parts of the machine.

Referring particularly to Figs. 1 and 5, it will be noted that herein the forward bearings are carried in openings formed in the lateral extensions 21 and 22 and are provided with closures or caps 25, the bearings being provided with flattened portions 23 coacting with corresponding flattened portions 24 on the chuck casing, thus preventing rotation of the bearings.

It will be noted that in the submitted embodiment of my invention described, the chuck, gear and chuck rotating motor surround the cylinder and that the cylinder is formed with a lateral extension or flange located rearwardly of its forward end, these extensions coacting with aligned extensions on the chuck casing; and that these extensions support the side shafts and are held in spaced relation by the casing for the motor and reduction gearing 34.

In the embodiment of my invention disclosed by the drawings the piston 26 is provided with a hammer bar 27 and is reciprocably supported within the cylinder member, the piston being operated by fluid.

As the particular manner in which the fluid is controlled to cause the piston to reciprocate is not claimed in this application only such description of the same will be given as will be sufficient to show how it is applied to the embodiment of my invention herein submitted.

As shown the piston is provided with an internal chamber 81 having a reduced bore 82 fitting a plug 83, the latter being provided with a passage 84 communicated with the continuous pressure space 80 through a hollow distributing valve 29. The passage 84 just referred to has communicating therewith lateral passages 85 adapted to convey the fluid to the chamber 81 of the piston whence it is distributed by means of the ports 86 in the piston, grooves 87 in the cylinder and grooves 88 in the plug to the opposite ends of the cylinder. The rear end of the cylinder is exhausted when the piston uncovers the cylinder port 89 communicating with a port 90 formed in the transverse partition 35 of the casing 34 hereinafter referred to. The motive fluid after passing through the partition discharges into that portion of the casing 34 forming the gear casing for the gears 15 and 18 and from there into the space 91 between the chuck 4 and chuck casing 23 whence it discharges into the atmosphere through the port 92 formed in the chuck casing, and into the chamber 93 in front of the hammer bar through the passage 94 formed in the chuck. By suitably closing the hole 92, as for example, by means of the thumb of the operator or by a valve or other suitable means the air is forced to pass into the chamber 93, whence it discharges into the longitudinal bore 94 of the drill steel, which bore conducts it to the cutting end of the steel where it discharges and cleanses the drill hole. As will be obvious the relative proportion of air discharging into the atmosphere and into the chamber 93 may be controlled by the degree of closure of the port 92. As shown, the hammer bar is made short enough to withdraw from the chamber 93 during the rearward stroke and this admits air from the cylinder into said chamber to augment the supply to the drill hole.

An additional admission and exhaust are provided for the opposite ends of the cylinder by means of passages controlled by the valve 29. To this end when the valve is in its forward position, as shown by Fig. 1, air is conducted to the front end of the cylinder by means of a passage 95 and while in this position air is conducted from the rear of the cylinder to the atmosphere through the ports 97 and 98 controlled by the valve. When the valve is moved to its rearward position the passage 95 is put in communication with the exhaust by means of the groove 99 of the valve and the port 100, while the passage 97 is closed to the exhaust by reason of the valve blanking the end of the passage 98 and is put in communication with the live air supply by means of the port 101. The kicker port for moving the valve is represented by the passage 102 provided with the ports 103 and 104 opening into the cylinder.

Leading from the exhaust passage 89 is an additional exhaust passage 105 extending through the wall of the cylinder to the rear head and communicating with the passage 100, it being understood that air passing from the cylinder through the port 89 finds its way to the atmosphere through the port 100 as well as by way of the port 90 and the gear casing.

Controlling the exhaust passage 100 and an admission passage 109 leading to the chamber 80 is a suitable valve 110 having a constant pressure live air chamber 112 and passage 113 respectively adapted to establish communication between a source of motive fluid and the admission passage and between the exhaust passage and a port 114 in the valve casing leading to the atmosphere. The valve is provided with a handle 111 which may be manipulated to turn the valve so as to cut off the supply to the passage 109 and establish communication between the live air chamber 112 of the valve and the exhaust passage 100 and at the same time cutting off the communication between the exhaust passage and the atmosphere by reason of the fact that the exhaust passage 113 of the valve is in this position out of communication with the passage 100 and the port 114 leading to the atmosphere. When the valve is in the position just described the live air admitted into the passage 100 finds is way into the passage 105 and discharges into the passage 90 whence it finds its way into the drill hole through the space 91 and passage 94.

The distributing plug 83 hereinbefore referred to is provided with a base portion 30 coacting with a block 31 to form a valve chamber for the distributing valve 29. The base of the grasping handle is recessed to receive the parts 30 and 31 just referred to and to secure them in assembled relation said parts are apertured to receive the through bolts 32. Preferably the cylindrical heads 33 of the bolts extend into the cylinder chamber and are suitably flattened on one side to conform with the surface of the interior wall of the cylinder, as illustrated in Fig. 3. This prevents turning of the bolts and serves as a dowel for aligning the cylinder with the base 2 of the grasping handle.

As has heretofore been stated the motor and gearing are herein surrounded by a casing 34 having a transverse portion 35. This transverse portion as illustrated bears on the cylinder member 3 and serves to divide the parts enclosed by the casing into two chambers, one for the motor and the other for the gearing. It also preferably is suitably apertured to provide a bearing 36 for the shafts. The casing 34 further serves as a spacing means between the lateral extensions 19 and 21. For securing the parts just enumerated together I have illustrated yoke members 37 provided with longitudinal portions 38 and transverse portions 39 and 40. The transverse portions of the yokes are held in engagement with the flange or base 2 of the grasping handle (which base herein provides a lateral cylinder extension) by setting them into grooves 41 while the yoke is secured at forward end by means of a set screw 43 engaging the recessed portion 44 of the bearing cap 25, the set screw serving also to draw the parts together. Rotation of the set screw is prevented by the binding action on the screw threads caused by the resiliency of the yoke.

In respect to the means for rotating the drill steel the rock drill disclosed herein is an improvement over the invention disclosed in my copending application Serial No. 350,577, filed January 10, 1920.

While I have herein described for purposes of illustration one specific embodiment of my invention it is to be understood that my invention is not limited to its particular mechanical details, but that wide deviations may be made therefrom without departing from the spirit of my invention.

Claims:

1. In a drilling machine, a cylinder having a lateral extension located rearwardly of its forward end, a drilling tool, a chuck for said tool, a chuck casing, said chuck casing having a part aligned with said extension, a rotation motor for said chuck, a casing for said motor, said motor and its casing both surrounding said cylinder, said rotation motor casing being supported between said extension and said part; and means for securing said lateral extension to said part for holding the cylinder, motor casing, and chuck casing in assembled relation.

2. In a drilling machine, a cylinder having a lateral extension located rearwardly of its forward end, a drilling tool, a chuck for said drilling tool, a chuck casing, said chuck casing having a part aligned with said extension, a rotation motor and gearing for said chuck, casing means for said motor and gearing, said casing means and motor surrounding said cylinder and said casing means being supported between said extension and said part; and means for securing said lateral extension to said part for holding said cylinder, chuck casing, motor and gearing in assembled relation.

3. In a drilling machine, a cylinder having a lateral extension located rearwardly of its forward end, a drilling tool, a chuck, a chuck casing, said chuck casing having a part aligned with said extension, a rotation motor for said tool comprising a plurality of rotary members, a casing for said rotation motor, said motor and its casing surrounding said cylinder and said casing being supported between said extension and said part; and means for securing said lateral extension to said part for holding the cylinder, motor casing, and chuck casing in assembled relation.

4. In a drilling machine, a cylinder having a lateral extension located rearwardly of its forward end, a drilling tool, a chuck for said drilling tool, a chuck casing, said chuck casing having a part aligned with said extension, a rotation motor for said tool comprising a rotary member actuated by pressure fluid and surrounding said cylinder, said rotation motor being supported between said extension and said part; and means for securing said lateral extension to said part for holding said cylinder, chuck casing, and motor in assembled relation.

5. In a drilling machine, a cylinder having a lateral extension located rearwardly of its forward end, a drilling tool, a chuck, a chuck casing, said chuck casing having a part aligned with said extension, a rotation motor comprising a plurality of rotary members, a reduction gearing comprising a gear member surrounding said cylinder and driven by said rotary members, means supporting said motor and gearing between said extension and said part; and means for securing said lateral extension to said part for holding said cylinder, chuck casing, motor and gearing in assembled relation.

6. In a drilling machine, a cylinder member having a lateral extension located rearwardly of its forward end, a drilling tool, a tool supporting structure having a part aligned with said extension, a spacing means between said extension and said part, said spacing means surrounding the cylinder member, and securing means holding the cylinder member, the tool supporting structure and spacing means in assembled relation.

7. In a drilling machine, a cylinder member having a lateral extension located rearwardly of its forward end, a drilling tool, a tool supporting structure having a part aligned with said extension, a spacing means between said extension and part, said spacing means surrounding the cylinder member and being supported thereby, and securing means holding the cylinder member, the tool supporting structure and spacing means in assembled relation.

8. In a drilling machine, a cylinder member having a lateral extension located rearwardly of its forward end, a drilling tool, a tool supporting structure having a part aligned with said extension, a spacing means between said extension and part, said spacing means surrounding the cylinder member, securing means holding the cylinder member, the tool supporting structure and spacing means in assembled relation, and a tool rotating motor housed by said spacing means.

9. In a drilling machine, a cylinder member having a lateral extension located rearwardly of its forward end, a drilling tool, a tool supporting structure having a part aligned with said extension, a spacing means between said extension and part, said spacing means surrounding the cylinder member, securing means holding the cylinder member, the tool supporting structure and spacing means in assembled relation and a tool rotating motor and gearing driven thereby housed by said spacing means.

10. In a drilling machine, a cylinder member having a lateral extension located rearwardly of its forward end, a drilling tool, a tool supporting structure having a part aligned with said extension, a spacing means between said extension and part, said spacing means surrounding the cylinder member, securing means holding the cylinder member, the tool supporting structure and spacing means in assembled relation, and a tool rotating motor comprising a rotor and gearing driven thereby housed by said spacing means.

11. In a drilling machine, a cylinder member having a lateral extension located rearwardly of its forward end, a drilling tool, a tool supporting structure having a part aligned with said extension, a spacing means between said extension and part, said spacing means surrounding the cylinder member, securing means holding the cylinder member, the tool supporting structure and spacing means in assembled relation, and a tool rotating motor comprising a rotor surrounding said cylinder member, and gearing driven thereby housed by said spacing means.

12. In a drilling machine, a cylinder member having a lateral extension located rearwardly of its forward end, a drilling tool, a tool supporting structure having a part aligned with said extension, a spacing means between said extension and part, said spacing means surrounding the cylinder member, securing means holding the cylinder member, the tool supporting structure and spacing means in assembled relation, a tool rotating motor comprising three intergeared members, one of which surrounds the cylinder member, gearing driven by one or more of said members, and said gearing and members being housed by said spacing means.

13. In a drilling machine, a cylinder, a drill steel, a rotary chuck having means for supporting said drill steel in non-rotatable relation thereto, a chuck casing for securing said chuck in operative position, said chuck and casing extending around the cylinder, and means for securing said chuck casing in non-rotatable relation to said cylinder.

14. In a drilling machine, a cylinder member, a drill steel, a rotary chuck having means for supporting said drill steel in non-rotatable relation thereto, a chuck casing, said chuck and casing extending around the cylinder member, means for securing said chuck casing to said cylinder member, motor mechanism surrounding said cylinder member, and means connecting said motor mechanism and chuck.

15. A casing, front and rear closures therefor, a rotary motor, a reduction gear, said motor and gearing being housed by said casing, and means exterior of said casing for securing said closures in position, said means comprising a yoke embracing the casing and means for holding the yoke in position.

16. A casing, front and rear closures therefor, a rotary motor, a reduction gear, said motor and gearing being housed by said casing, and means exterior of said casing for securing said closures in position, said means comprising a plurality of side members arranged exteriorly of the casing, a transverse member engaging one of said closures and connected to said side members.

17. The combination with the supporting member of a percussive tool of a cylinder member having a flange located rearwardly of its forward end, a chuck rotating motor abutting said flange and means securing said cylinder member and motor in assembled relation and to said supporting member.

18. The combination with the supporting member of a percussive tool, of a cylinder member having a flange located rearwardly of its forward end, a casing, a chuck rotating motor, a gearing, said motor and gearing being housed in said casing, said casing abutting said flange, and means for holding said casing and cylinder member in assembled relation and to said supporting member.

19. The combination with the supporting member of a percussive tool, of a cylinder member having a flange located rearwardly of its forward end, a casing, a chuck rotating motor, a gearing, said motor and gearing being housed in said casing, said casing abutting said flange, a chuck casing abutting said first mentioned casing, and means for holding said casing and cylinder member in assembled relation and to said supporting member.

20. A drilling machine having in combination, a cylinder, a hammer piston in said cylinder, a drill steel, a chuck for said drill steel, a chuck casing, a motor for rotating said chuck, a casing for said motor, a handle member for said machine, said handle member, cylinder, and chuck casing having aligned lateral flanges, said casing for said motor being positioned between said flanges of said cylinder and chuck casing, and means engaging the flanges of said handle member and chuck casing for holding the parts in assembled relation.

21. In a drilling machine, a cylinder, a piston therein, a chuck, a chuck gearing having a gear casing surrounding said cylinder, means for supplying said gear casing with live air, and means for conducting said live air from the gear casing to the work.

22. In a drilling machine, a cylinder, a piston therein, a chuck, a chuck gearing having a gear case surrounding said cylinder, an exhaust port for said cylinder, means establishing communication between said port and said casing, a live air supply, means for connecting said live air supply to said casing, and conduit means for conducting fluid from said casing to the work.

23. In a drilling machine, a cylinder, a piston therein, an exhaust port for said cylinder, a chuck, a gearing for said chuck surrounding said cylinder, a casing for said gearing, means establishing communication between said gear casing and exhaust port, and conduit means for conducting fluid from said casing to the work.

24. In a drilling machine, a cylinder, a piston therein, an exhaust port for said cylinder, a chuck, a gearing for said chuck surrounding said cylinder, a casing for said gearing, means establishing communication between said gear casing and exhaust port, conduit means for conducting fluid from said casing to the work, conduit means for conducting fluid from said casing to the atmosphere, and means for proportioning the relative amounts passing to the work and atmosphere.

25. In a drilling machine, a cylinder, a piston therein, a chuck, a chuck gearing having a gear casing surrounding said cylinder, means for supplying said gear casing with live air, means for conducting said live air from the gear casing to the work, and means for regulating the amount so conducted.

26. In a drilling machine, a cylinder, a piston therein, a chuck, a chuck gearing having a gear case surrounding said cylinder, means for supplying said gear case with live air, conduit means for conducting said air from the gear case to the work, conduit means connecting said first conduit means with the atmosphere, and means for regulating the amount of air passing through one of said conduit means.

27. In a drilling machine, a chuck, a drill steel carried by said chuck, a reduction gearing for said chuck, a casing for said gearing, means establishing communication between said casing and the work, and a single valve for optionally connecting said casing either to the atmosphere or to a source of live air, and a motor for actuating said steel and having an exhaust port discharging into said casing.

28. In a rock drill, a cylinder, a hammer piston in said cylinder, a drill steel operated by said hammer piston, a chuck carrying said drill steel, said chuck having a rearwardly extending sleeve surrounding said cylinder, external gear teeth carried by said chuck, a gear surrounding said cylinder and meshing with a gear at the side of said cylinder, an eccentric at the side of said cylinder driven by said gear at the side of said cylinder, a yoke carrying internal gear teeth surrounding said cylinder and meshing with said external gear teeth carried by said chuck, a supporting handle having a base closing said cylinder, a casing structure for said gears, said chuck and said yoke, and means for securing said cylinder and said casing structure to said base of said handle.

29. In a rock drill, a hammer, a hammer cylinder, a drill steel, a chuck for said steel, a motor for said chuck, reduction gearing for said motor, means providing a casing for said motor and reduction gear, and means for holding said cylinder and casing in assembled relation comprising a yoke adapted to surround said casing, and means for securing said yoke.

In testimony whereof, I have signed my name to this specification.

GEORGE H. GILMAN.